United States Patent [19]
La Porta et al.

[11] Patent Number: 6,041,103
[45] Date of Patent: *Mar. 21, 2000

[54] INTERACTIVE CALL IDENTIFICATION

[75] Inventors: Thomas F. La Porta, New York, N.Y.; Arun N. Netravali, Westfield, N.J.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/632,860

[22] Filed: Apr. 16, 1996

[51] Int. Cl.$^7$ .......................... H04M 1/64; H04M 11/00; H04M 3/42

[52] U.S. Cl. .................. 379/67.1; 379/88.25; 379/93.01; 379/201; 379/212

[58] Field of Search ................................. 379/67, 88, 89, 379/201, 202, 207, 93, 96, 100, 67.1, 88.01, 219, 185, 211, 88.17, 88.18, 88.25, 88.26, 212, 204, 93.01; 370/352, 353, 380

[56] References Cited

U.S. PATENT DOCUMENTS

| | | | |
|---|---|---|---|
| 4,551,581 | 11/1985 | Doughty | 379/94 |
| 4,582,956 | 4/1986 | Doughty | 379/94 |
| 4,899,358 | 2/1990 | Blakely | 379/67 |
| 4,899,375 | 2/1990 | Bauer et al. | 379/264 |
| 4,939,771 | 7/1990 | Brown et al. | 379/67 |
| 4,972,461 | 11/1990 | Brown et al. | 379/67 |
| 5,117,451 | 5/1992 | Ladd et al. | 379/67 |
| 5,181,237 | 1/1993 | Dowden et al. | 379/88 |
| 5,327,486 | 7/1994 | Wolff et al. | 379/96 |
| 5,333,180 | 7/1994 | Brown et al. | 379/89 |
| 5,349,636 | 9/1994 | Irribarren | 379/89 |
| 5,384,831 | 1/1995 | Creswell et al. | 379/67 |
| 5,390,241 | 2/1995 | Bales et al. | 379/207 |
| 5,408,526 | 4/1995 | McFarland et al. | 379/202 |
| 5,463,684 | 10/1995 | Morduch et al. | 379/201 |
| 5,557,658 | 9/1996 | Gregorek et al. | 379/67.1 |
| 5,604,737 | 2/1997 | Iwami et al. | 370/352 |
| 5,608,786 | 3/1997 | Gordon | 379/100 |
| 5,610,910 | 3/1997 | Focsaneanu et al. | 370/351 |
| 5,742,905 | 4/1998 | Pepe et al. | 455/461 |
| 5,805,587 | 9/1998 | Norris et al. | 370/352 |

*Primary Examiner*—Fan S. Tsang
*Assistant Examiner*—Allan Hoosain
*Attorney, Agent, or Firm*—Morgan & Finnegan, LLP

[57] ABSTRACT

A method and apparatus for interactive call identification of a call to a called party. Identifying messages, either text and voice, can be entered on a call-by call basis by the calling party to provide information regarding the call to enable the called party to screen the incoming call. Such identifying messages can include descriptive information about the identity of the caller, the subject matter of the call or any other user-user information. The identifying message is transmitted in the form of a real-time message sent by the caller and received by the party being called in advance of their accepting the call. The identifying message is created on a call-by-call basis by the calling party. The called party receives the identifying message and, after receiving the message, the called party can accept, forward or reject the incoming call based on the information provided in the identifying message. The calling party has the option of using either real-time or pre-recorded message functions. The calling party can select, via a predetermined access code to enter a personal message (voice or text) directly from the location from which the call is being placed after dialing the desired number. Interactive call identification can be initiated either by the called or calling party.

48 Claims, 9 Drawing Sheets

ISDN CALL ESTABLISHMENT MESSAGE FLOW

→ = MESSAGE SENT OVER SIGNALING LINKS

CALLING PARTY INITIATED, TEXT MESSAGE

SERVER PROCESSING FLOW, VOICE MESSAGE

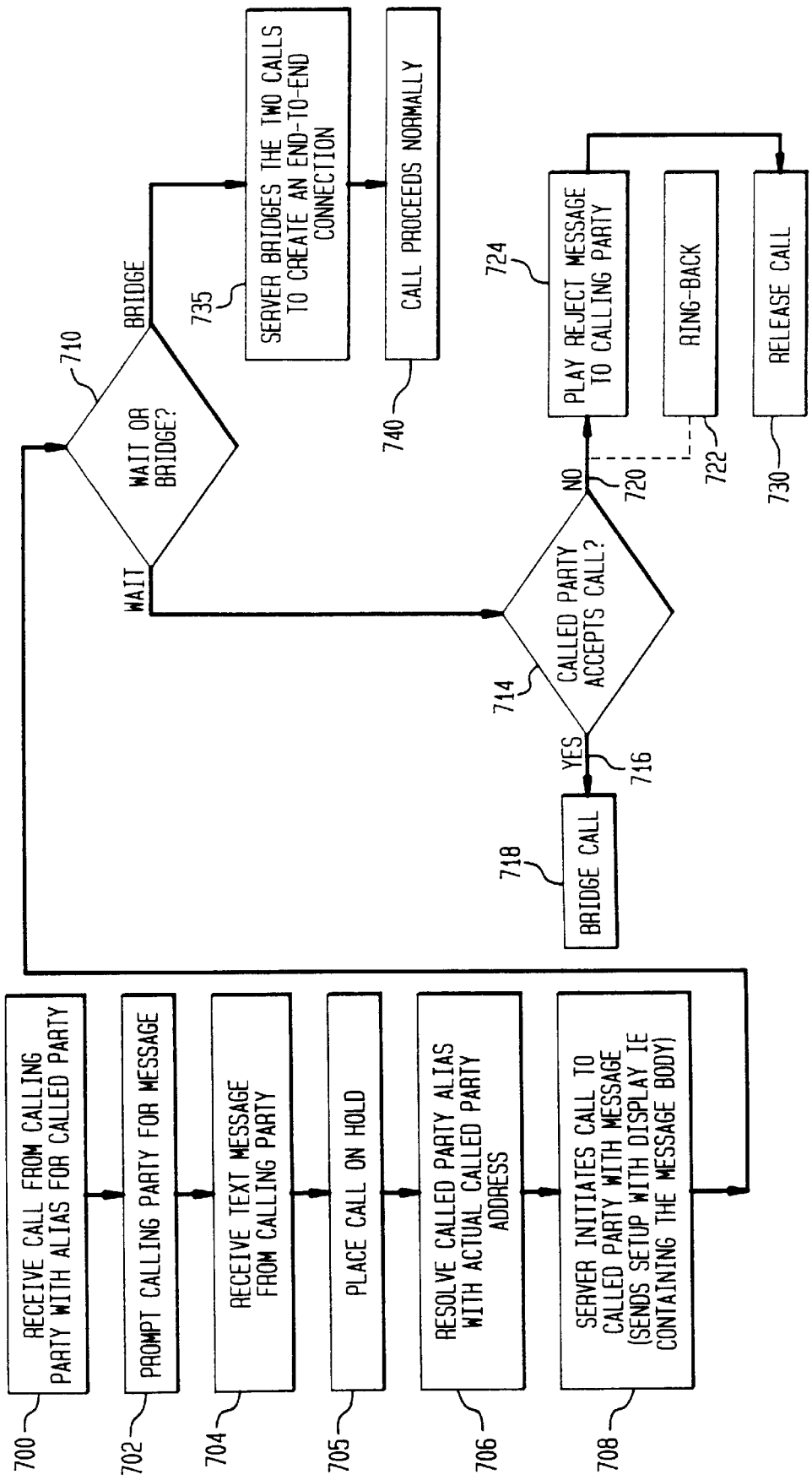

INTERACTIVE CALL IDENTIFICATION

BACKGROUND OF THE INVENTION

1. Technical Field

This invention relates generally to telecommunications systems, and more particularly, to a method and apparatus for implementing interactive call identification to facilitate caller identification.

2. Related Background Art

Prior to picking up the handset on a ringing telephone, thereby accepting an incoming call, it is increasingly desirable for a call recipient to have access to certain information about that incoming call prior to accepting the call. Having access to this information will aid the call recipient in screening the incoming call to decide whether or not to accept it.

Various call identification methods are currently available which provide selected information to the call recipient regarding the incoming call to aid him or her in identifying that incoming call.

These known call identification methods include features to display call information to the call recipient by sending and displaying a data message to the called station. These methods however, are inherently limited in the scope of information they are capable of conveying to the screening call recipient.

The call information (i.e., the data message) provided in the se known call identification methods consists of, or at best is derived from, the phone number of the station from which the caller is placing the call, providing little more information than the calling station number to the called party. The nature or purpose (i.e., subject matter) of the call or any other information, is left to be discovered by the called party only after accepting the call.

These known methods typically identify the number of the station from which the calling party is placing the call from a unique code associated with that station from which the call is placed. Where the subscribing call recipient has installed the necessary hardware (i.e., digital display of some type or an ISDN station), the station number from where the calling party is placing the call will be displayed. Where the call recipient has a conventional analog station, these identification services are unavailable without additional equipment. Further, the calling number will be available to the called party only where the calling party has not blocked the information.

Since a called party will typically only have a few of the more frequently used numbers committed to memory, a method of merely displaying the calling station number is of limited utility.

Related methods will also display the caller's name, derived from the calling station number, or other limited data messages. While these methods are potentially more helpful to the call recipient in deciding whether to take a call, they still suffers from the inherent limitation that any information provided to the called party is by necessity tied to the phone station from which the call is placed.

A call-announcement method is also available for call identification.

In the call announcement scheme, a text-to-speech converter generates speech signals from text retrieved from a database, for transmission to the called station. The database contains information associated with the calling party's number, specifically, the calling party's name. After answering the call, a subscribing call recipient will receive synthesized, spoken information consisting of the calling party's name and/or number. This service is made available to customers having conventional analog or ISDN equipment.

A related development in call identification is that the call recipient who subscribes to the call announcement service can also make a personalized list, resident in the subscribing party's station equipment or central office, where the phone number of frequent callers is correlated to an identifying message, either recorded voice or text, entered by the subscriber. However, the calling party must have an entry in the called party's database corresponding to the number from which the calling party is calling in order for their call to be meaningfully announced to the called party. Where there is no corresponding entry on the list, an incoming call may remain unidentified or may be misidentified.

Also, as is common to the previously mentioned call identification methods, where a known and welcome caller is calling from someone else's phone or is identified as an 'unlisted caller' because he is calling from an unknown (such as a payphone) or blocked number, a call from an otherwise welcome caller may go unanswered due to the lack of or improper identification.

As has been illustrated, an inherent limitation in these known methods is that identification of a calling party is constricted to the station from which the call is being placed, providing little, if any, information beyond the calling station number. This is of limited value if someone with whom the recipient wishes to speak is calling from an unfamiliar telephone. With the known call identification methods, the call recipient would in this case see an unfamiliar telephone number as identifying the incoming call and have no further information upon which to decide whether or not the call should be accepted. Even the slightly more sophisticated call-announcement method gives little more pre-answer information to the call recipient as it is still tied to the station number from which the incoming call is placed and any possible messages to be retrieved can, practically speaking, only be generic in nature (i.e., "This is Bob.")

In any event, the nature or subject of the call will remain unknown to the recipient until he or she actually takes the incoming call.

Thus, to illustrate, with the known methods, calling party 'A' cannot be properly identified to the called party as 'A' unless 'A' is placing the call from a phone or station having a directory number associated with 'A'. If 'A' places the call from a station assigned to party 'B', party 'A' will be mis-identified to the call recipient as party 'B'.

Other known messaging methods which allow a caller to send a voice message to a called party are restricted by other limitations. Although providing capabilities of custom message recording, a separate call is required during which the message is created. The message is then delivered at a scheduled delivery time to a recipient party.

As is evident from the foregoing, limitations in known methods limit the effectiveness, and therefore the utility, of the current level of advancement achieved in the area of call identification.

SUMMARY OF THE INVENTION

Limitations of known call identification and announcement methods are resolved and technical advances are achieved in the present invention by a method and system for interactively identifying a telephone call on a communication network as part of call establishment procedure.

A telephone call is terminated in a first telephone connection from a calling location. A message is received from the calling location. This message is then stored. The message is then relayed over a second telephone connection to the called location. The telephone call is then processed based on an input from the called location.

Alternatively, the first connection can be placed on hold prior to relaying the message, while the second connection is established. The method and system can include prompting the calling party to enter a message.

The message transfer can be initiated by either the calling or called party, via subscription or via activation by the calling party entering special activation codes when placing the call.

The processing of the telephone call can include bridging the telephone connection immediately, forwarding the call to a forwarding location, accommodation for call waiting, and rejecting the call where a message can be sent back to the calling party and the call can then be released.

The method and system of the present invention can be implemented on an Integrated Services Digital Network; a broad band signalling Integrated Services Digital Network; a packet network or a POTS network utilizing DTMF signals.

The messaging transfer can be implemented on a network server, an originating switch, an intermediate switch, or a terminating switch.

The method and system are capable of supporting both voice and text messages which can be entered on a call-by-call, or real-time basis. The text messages may be entered via a keyboard or personal computer. The text message may also be pre-stored and/or selectable and/or expandable. The text message may also be converted into audio.

BRIEF DESCRIPTION OF DRAWINGS

The following drawings are referenced in the detailed description which follows and are provided to facilitate a better understanding of the invention disclosed herein.

FIG. 11 illustrates the processing flow for the server function element processing a text message according to the present invention.

DETAILED DESCRIPTION OF THE PREFERRED EMBODIMENTS

Figure 1:
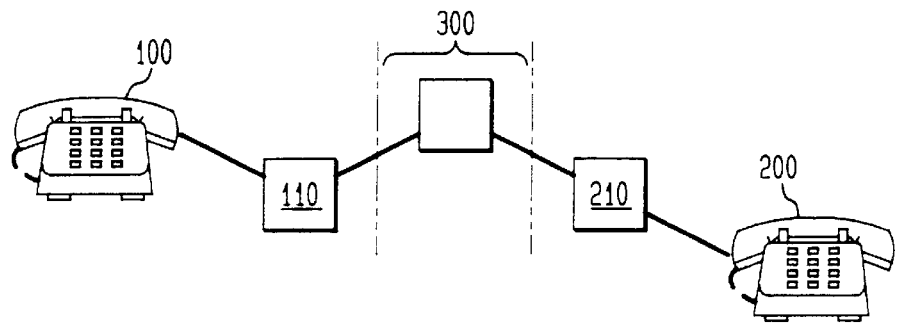
FIG. 1 illustrates a typical communication path for an end-to-end call from a calling party to a called party.

Referring to FIG. 1, when a calling party 100 places a call to a called party 200, current technology establishes a connection between these two end-users. This is achieved by the signalling system. The signalling system attempts to confirm a clear line via a specific route from the calling party 100 to originating switch 110 through the central office 300, to the appropriate terminating switch 210, finally to the called party 200. The route is established by the signalling system via connections through the various required paths until the line is complete from end-to-end.

Figure 2:
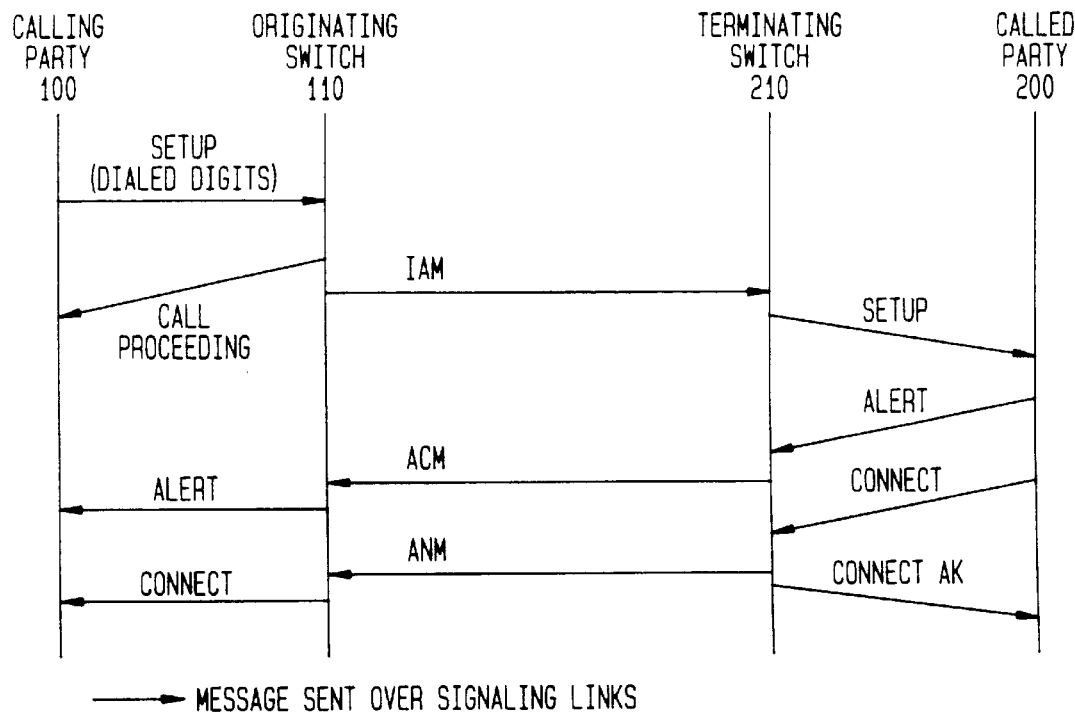
FIG. 2 illustrates typical ISDN signalling flow for the completed end-to-end call of FIG. 1.

With reference to FIG. 2, the standard procedure of determining a clear line connection involves what can be summarized as a three stage process. First, the calling party station 100 must establish a connection to its originating switch 110; second, the originating switch 110 must then establish connection to the destination or terminating switch 210, via any intermediate devices (for illustrative purposes, the described embodiments of the present invention assume that the calling and called parties are served by different switches, however, the principles of the present invention are equally applicable where both the calling and called parties are served by the same switch, i.e., originating and terminating switches are the same); and, finally, the terminating switch 210 must establish a connection to the called party station 200. When all stages of the connection process are completed a clear line is established between calling 100 and called 200 party stations.

Once the clear line is thus established, the called party 200, by picking up the handset of his ringing telephone, accepts the call and the originating switch 110 completes the connection between the calling and called stations, and end-to-end communication (between calling and called stations) may then begin.

Figure 3:
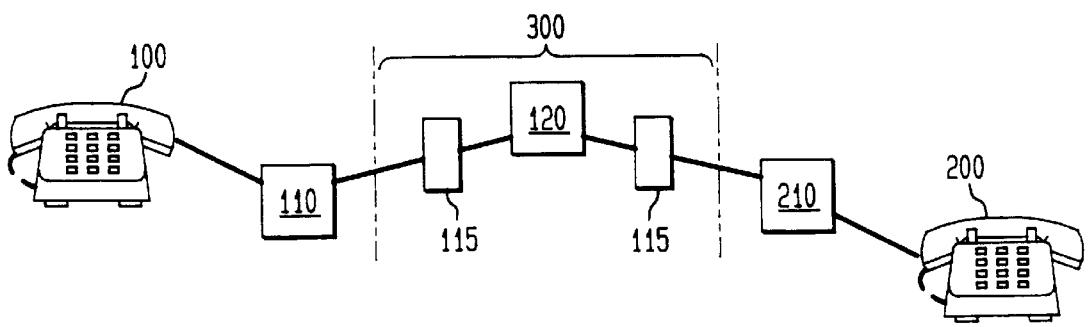
FIG. 3 illustrates a communication path of the present invention as routed through a special server and intermediate central office switches.

FIG. 3 illustrates a communication path for an end-to-end call from a calling party 100 to a called party 200 according to one exemplary embodiment of the present invention.

In the present invention, information concerning the identity of the caller, subject matter of the call or any other user-user information ("UUI"), is sent by the caller 100 and is received by the called party 200 in advance of the called party 200 answering the call as part of the call set-up. The UUI information of the present invention is provided in the form of a voice or text message which is created interactively on a call-by-call basis by the calling party upon initiating the call. The message can be entered by the calling party on a real-time basis or generated from messages pre-stored on a database.

Referring to FIG. 3, an end-to-end communication path is established between a calling party 100 and a called party 200. The signalling system attempts to confirm a clear line via a specific route from the calling party 100 to originating switch 110 through the central office 300, which in this embodiment may include central office intermediate switches 115 and special network server 120, to the appropriate terminating switch 210, finally to the called party 200. The route is established by the signalling system via connection through the various required paths until the line is complete from end-to-end.

Either the calling or called party can initiate message transfer according to the present invention.

One embodiment of the present invention is implemented where the called party 200 subscribes to the message transfer service of the present invention and is thus the initiator of the message transfer service. When a call is placed to the called party 200, the call is routed to a special server 120 which terminates the call. Therefore, the called party number dialed by the calling party is an "alias" which instructs the network to route the call to the special server 120. The special server 120 then prompts the calling party 100 for their message. Once their message has been accepted, the special server 120 places the call on hold, and initiates a second call to the called party 200, over which it delivers the voice or text message as will be explained. If the called party 200 accepts the call, the special server 120 bridges the two calls, the connection is completed and communication can begin. Alternatively, the called party 200 may forward the call, where the special server 120 completes the call to the forwarding point, and then bridges the connections. Finally, in the system default, the called party 200 does not answer the call, and the special server 120 generates a ring-back to the calling party 100 which will experience a "ring-no-answer" condition and eventually hang up.

Figure 4:
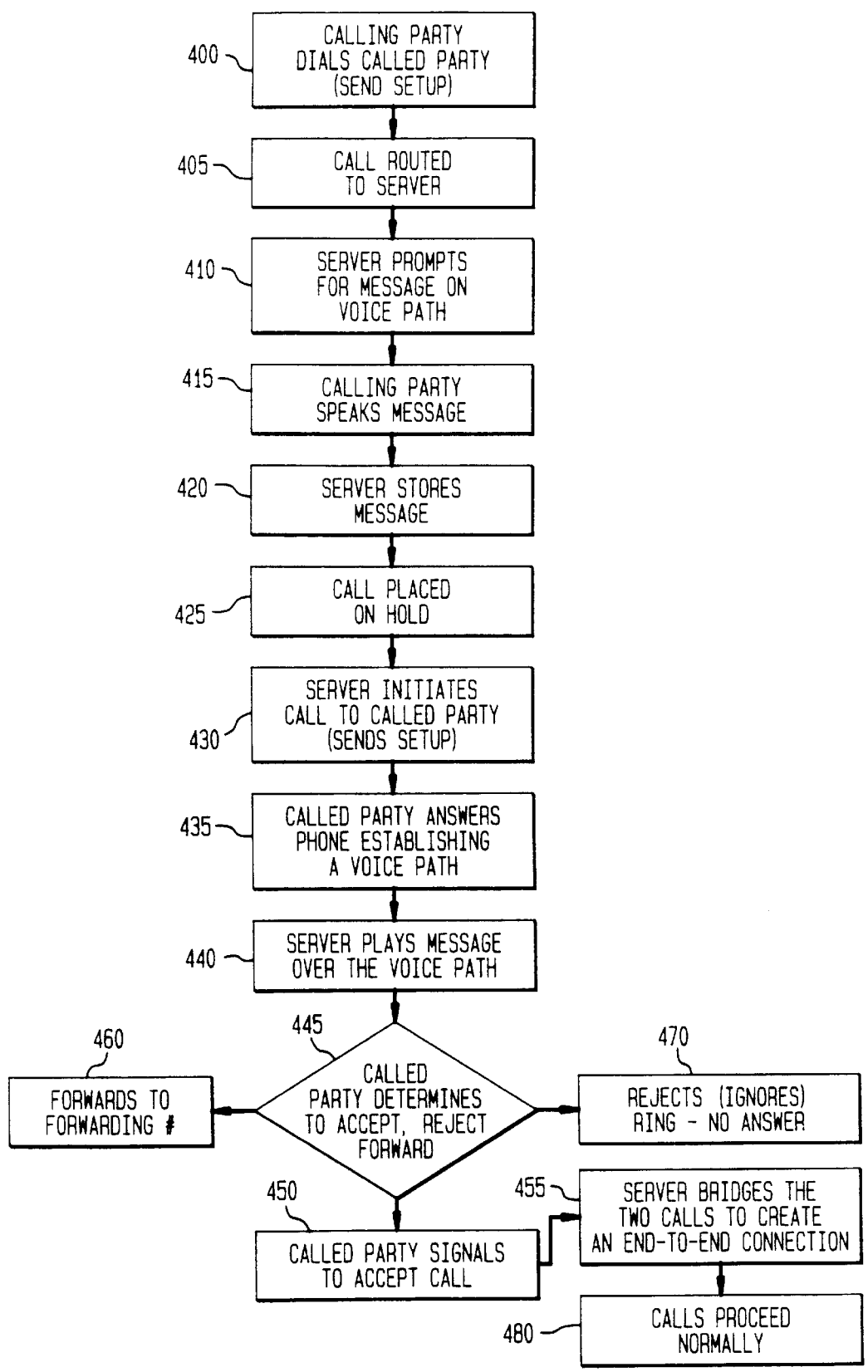
FIG. 4 illustrates the ISDN processing flow for an implementation of the present invention according to one embodiment of the present invention initiated by the called party for voice messaging.
Figure 5:
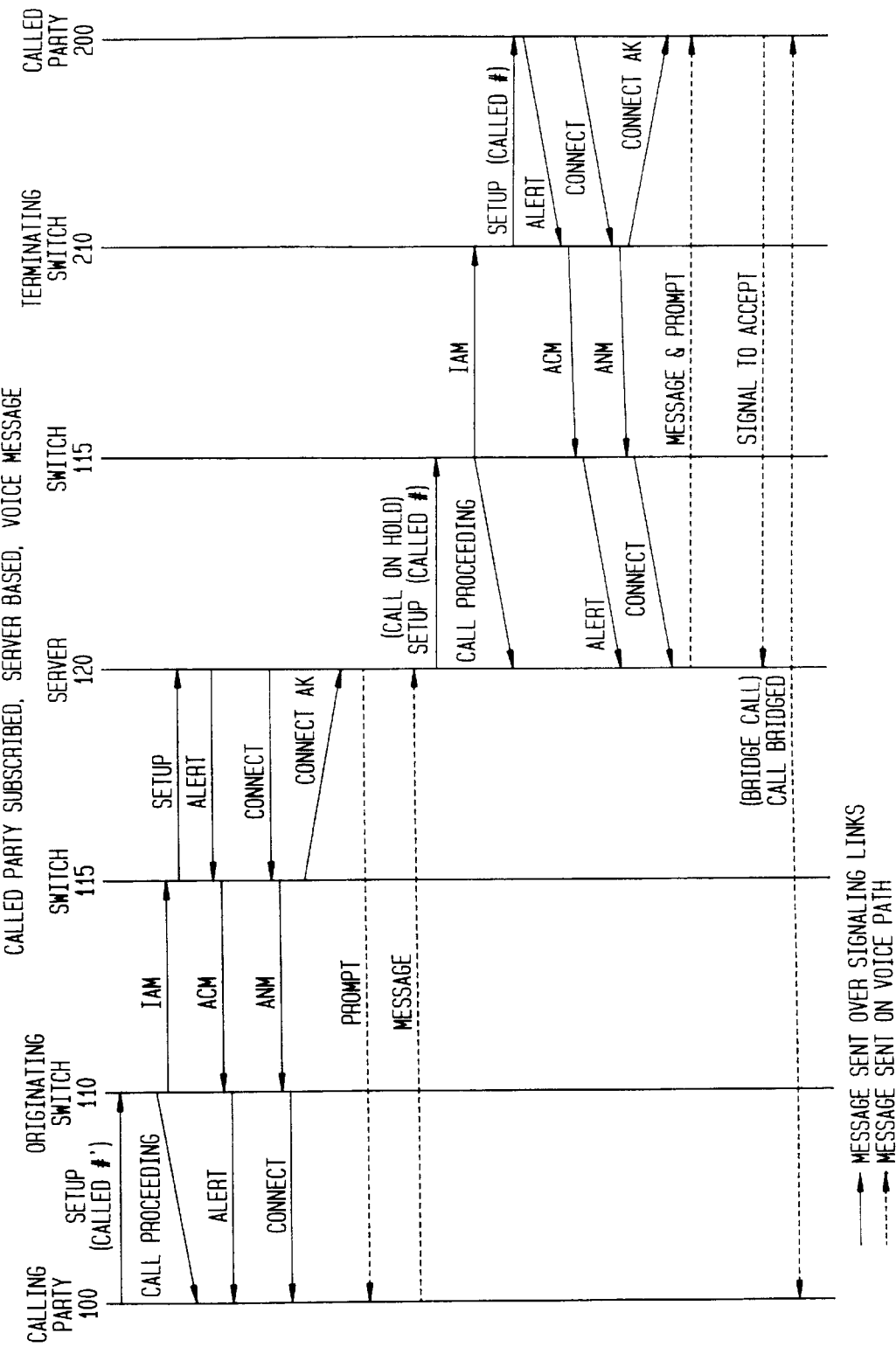
FIG. 5 illustrates the message flow for the processing flow of FIG. 4.

FIG. 4 illustrates the Integrated Services Digital Network ("ISDN") processing flow for a special server based implementation in one exemplary embodiment of the present invention. In this embodiment, message transfer is initiated by a subscribing called party. Illustrated in FIG. 4 is a voice message sent from a calling party 100 to a subscribing called party 200, where the call is accepted by the called party 200. FIG. 5 presents detailed message flow for the processing flow illustrated in FIG. 4, depicting this embodiment of the present invention in a condition where the called party accepts the incoming call.

Referring to FIG. 4, in step 400, a SETUP message is generated from the calling party to originating switch when the calling party dials the called party's number. This SETUP message contains the alias for the called party number ("called #'") which instructs the originating switch, in step 405, to route the call to a special server 120 using standard ISDN procedures. The special server, in step 410, prompts the calling party to enter a message over the established connection. In step 415, the calling party enters the desired message, in this example a voice message, by speaking into the telephone handset. This voice message is stored in the special server in step 420 and the call between the calling party and the special server is placed on hold in step 425. The special server 120 then initiates a call to the called party using standard ISDN procedures in step 430 to establish a voice path to the called party. After the voice path is established to the called party in step 435 (for example, either a speakerphone is activated or the receiver is picked up on a conventional telephone), the special server plays the voice message over the newly established voice path in step 440. The called party, then decides in step 445 whether to accept the call based on the content of the message, enters a code to either accept the call, forward the call, or reject (i.e., ignore) the call. If the called party accepts the call in step 450, the special server will bridge the two calls to create an end-to-end connection in step 455 and the call can proceed normally in step 480. If the called party forwards the call in step 460, the special server will forward the call to the forwarding number according to standard procedures and the call can proceed normally in step 480. If the called party rejects or ignores the call in step 470, a "ring-no answer" is encountered by the calling party and the call proceeds normally in step 480 where a "ring-no answer" is experienced by the calling party 100 until the calling party hangs up.

Referring now to FIG. 5, a SETUP message is generated over signaling links from the calling party 100 to originating switch 110 when the calling party dials the called party's number. (See 400, FIG. 4.) This SETUP message contains an alias for the called party number ("called #'") which instructs the originating switch 110 to route the call to a special server 120, via any central office intermediate switches 115. (See 405, FIG. 4.) Using standard ISDN procedures, the call is completed to the special server 120. The special server 120 prompts the calling party 100 to enter a message, voice or text, over the established connection. (See 410, FIG. 4.) In this example, the calling party 100 enters a voice message by speaking the message into the telephone handset. (See 415, FIG. 4.) This voice message is stored in the special server 120 (See 420, FIG. 4.) and the call between the calling party 100 and the special server 120 is placed on hold. (See 425. FIG. 4.) The special server 120 then initiates a call via any central office intermediate switches 115 and terminating switch 210 to the called party 200 using standard ISDN procedures. (See 430, FIG. 4.) After the called party 200 answers the call (See 435, FIG. 4.), as is indicated by the CONNECT message sent over signalling links from the called party 200 to its terminating switch 210 through to special server 120, the special server 120 plays the voice message over the newly established connection. (See 440 FIG. 4.) The special server 120 also prompts 230 the called party 200 to enter a code to either accept the call, forward the call, or reject (i.e., ignore) the call. In the example implementation illustrated in FIG. 5, the called party 200 signals to accept the call. At this time, the special server 120 bridges the connections between the calling party 100 and called party 200 and the call is established end-to-end (100 to 200). (See steps 445, 450, 455 FIG. 4.) The call now proceeds normally. (See 480 FIG. 4.)

Figure 6:
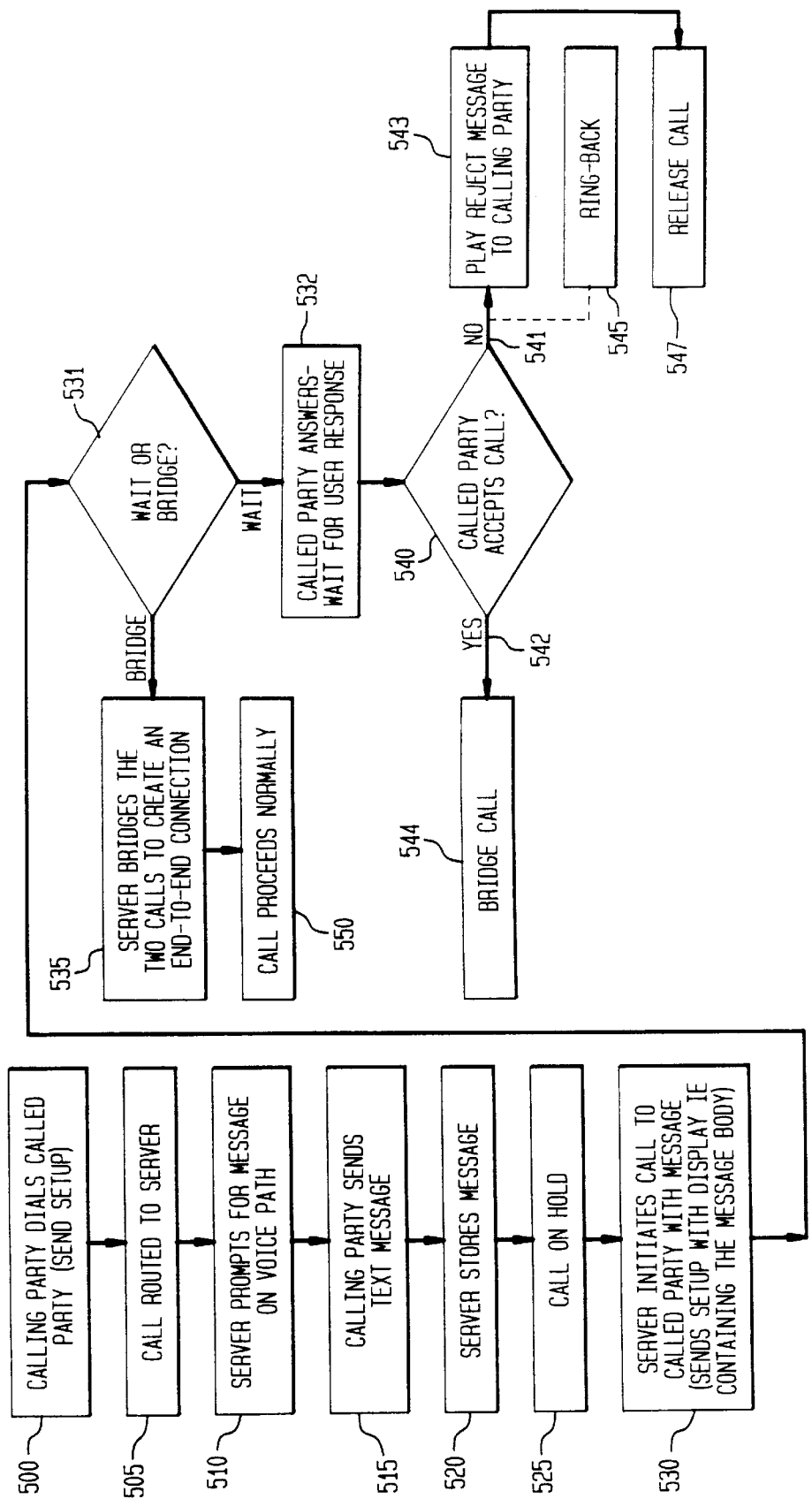
FIG. 6 illustrates the ISDN processing flow for an implementation of the present invention according to one embodiment initiated by the called party for text messaging.
Figure 7:
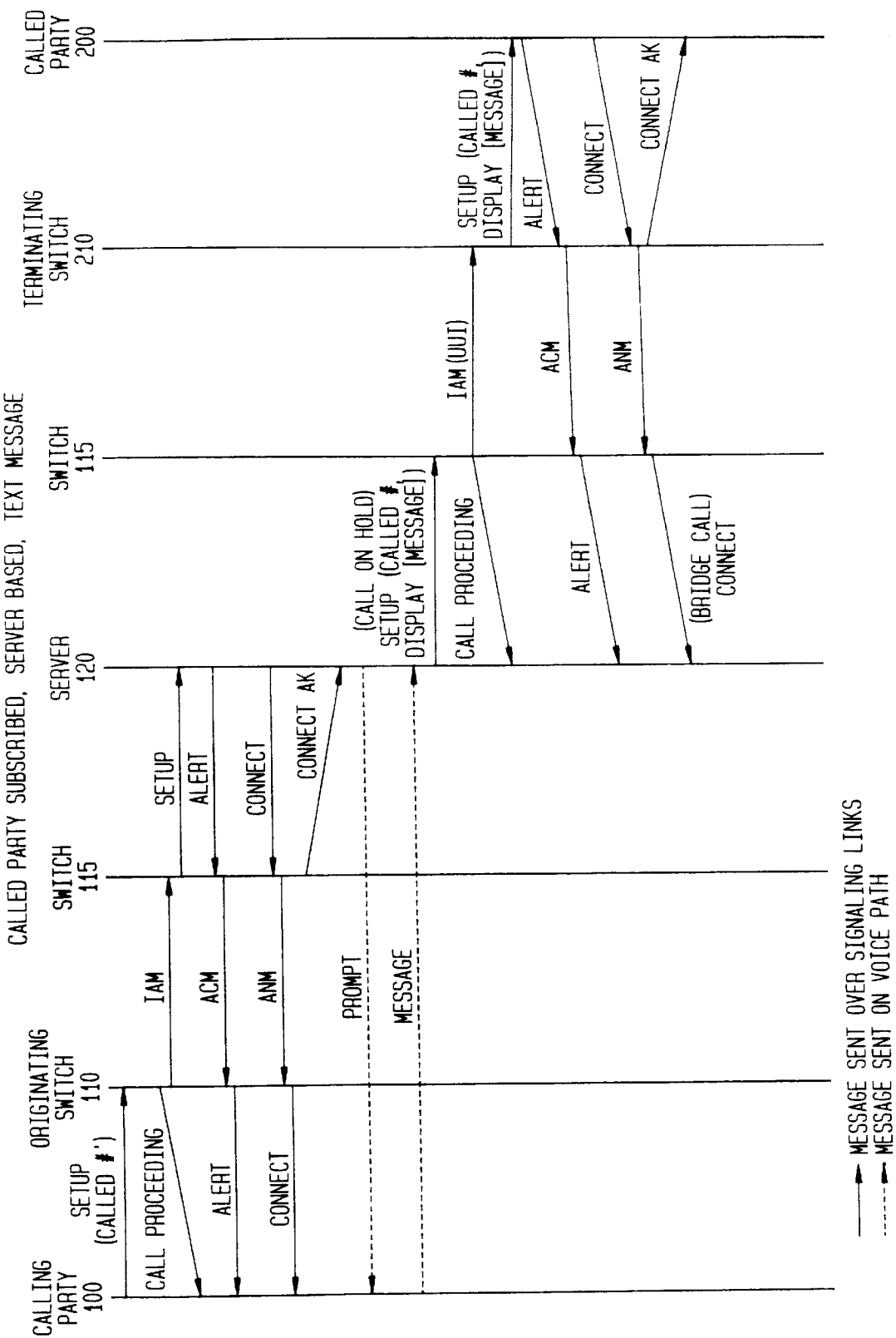
FIG. 7 illustrates the message flow for the processing flow of FIG. 6.

FIG. 6 illustrates the ISDN processing flow for a special server based implementation in another exemplary embodiment of the present invention. In this embodiment, message transfer is initiated by a subscribing called party. Illustrated in FIG. 6 is a text message is sent from the calling party 100 to the subscribing called party 200, where the call is accepted by the called party 200. FIG. 7 presents detailed message flow for the processing flow illustrated in FIG. 6, depicting this embodiment of the present invention in a condition where the called party 200 accepts the incoming call.

Referring to FIG. 6, in step 500, a SETUP message is generated over signaling links from the calling party 100 to the originating switch 110 as in the implementation example of FIGS. 4 and 5. Again, using standard ISDN procedures, the call is completed to a special server 120 in step 505. The special server 120 prompts the calling party 100 to enter a text message over the established connection in step 510. (Again, the calling party can select either a voice or text message, but for this exemplary embodiment, a text message was chosen for illustrative purposes.) In step 515, the calling party either enters the text message using a keyboard (via, for example, a personal computer with a modem), or enters a code for a message that is pre-stored in its phone. Where a code for a pre-stored message is chosen, the telephone expands the message code into a full textual message using known methods. The text message is then stored in the special server 120 in step 520 and the call between the calling party and the special server 120 is placed on hold in step 525. The special server 120 then initiates a call to the called party in step 530, using standard ISDN procedures, and sends the text message for display to called party 200.

In step 531, an option is selected to either "wait" or "bridge" the call.

If the "bridge" option is chosen, the call is bridged immediately in step 535. When the called party accepts the call, as in this example, process flow continues in step 535 where the special server will bridge the two calls to create an end-to-end connection in step and the call can proceed normally in step 550.

If the "wait" option is chosen, the call will not be bridged, forwarded or released until a user response from the called party has been received. In step 532, the called party sends instructions and the flow continues to step 540.

In step 540, the server function element resolves, based on input from the called party, to either accept the call (step 542), or not (step 541). Where the called party has accepted the call (542), the server function element will bridge the call (either connect or forward) in step 544. Where the called party has not accepted the call (541), the server function element will either, at the choice of the called party, do nothing and "Ring Back" (i.e., allow a "ring no answer" condition to persist) in step 545, or it can be configured to play an announcement to the called party that the call was not accepted by the called party 200 (step 543) and finally release the call in step 547.

Referring now to FIG. 7, a SETUP message is generated over signaling links from the calling party 100 to originating switch 110 when the calling party dials the called party's number. (See 500, FIG. 6.) This SETUP message contains an alias for the called party number ("called #'") which instructs the originating switch 110 to route the call to a special server 120, via any central office intermediate switches 115. (See 505, FIG. 6.) Using standard ISDN procedures, the call is completed to the special server 120. The special server 120 prompts the calling party 100 to enter a message over the established connection. (See 510, FIG. 6.) The calling party 100 enters and sends the text message. (See 515, FIG. 6.) (Again, the calling party can select either a voice or text message, but for this exemplary embodiment, a text message was chosen for illustrative purposes.) This text message is stored in the special server 120 (See 520, FIG. 6) and the call between the calling party 100 and the special server 120 is placed on hold. (See 525, FIG. 6.) The special server 120 then initiates a call to the called party 200 using standard ISDN procedures, sending the text message as well. The message is sent to the called party 200 by the terminating switch 210 in the DISPLAY information element of the SETUP message. (See 530, FIG. 6.) The special server 120 bridges the connections between the calling party 100 and called party 200, and the text message will then be displayed at the called party cite. (See step 535 FIG. 6.) After the called party 200 answers the call, and the call is established end-to-end (100 to 200). The call now proceeds normally. (See 550 FIG. 6.)

Although in the embodiment depicted in FIG. 7, the call is bridged immediately (i.e., with reference to FIG. 6, flow continues, from step 530, through step 531, to step 535), an option can be selected to "wait". (Step 531, FIG. 6). If the "wait" option is chosen, the call will not be bridged, forwarded or released until a user response from the called party has been received (step 532, FIG. 6). A signal flow, corresponding to the process flow for steps 531 to 540 (FIG. 6), along the "WAIT" path, would then be implemented.

Figure 8:
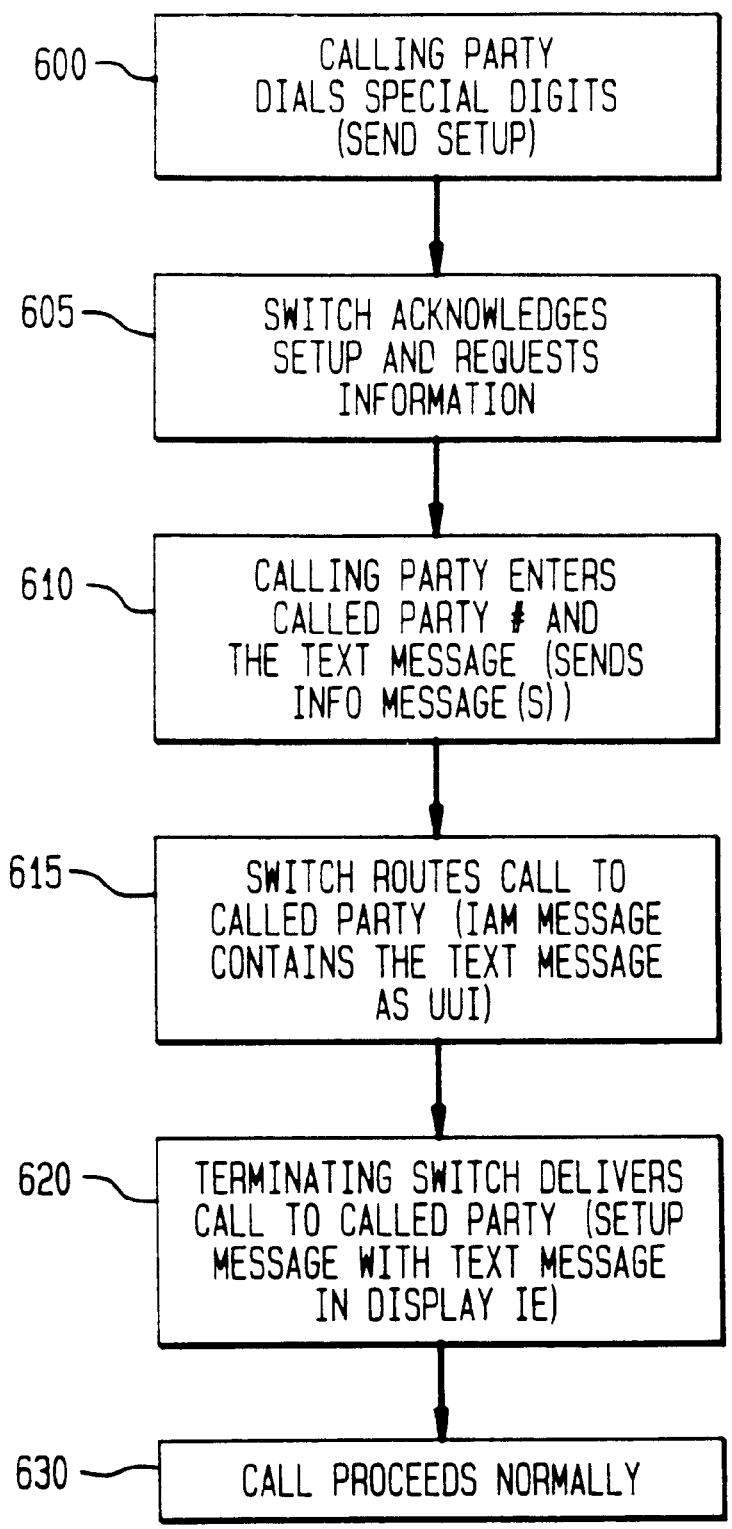
FIG. 8 illustrates the ISDN processing flow for an implementation of the present invention according to one embodiment initiated by the calling party.
Figure 9:
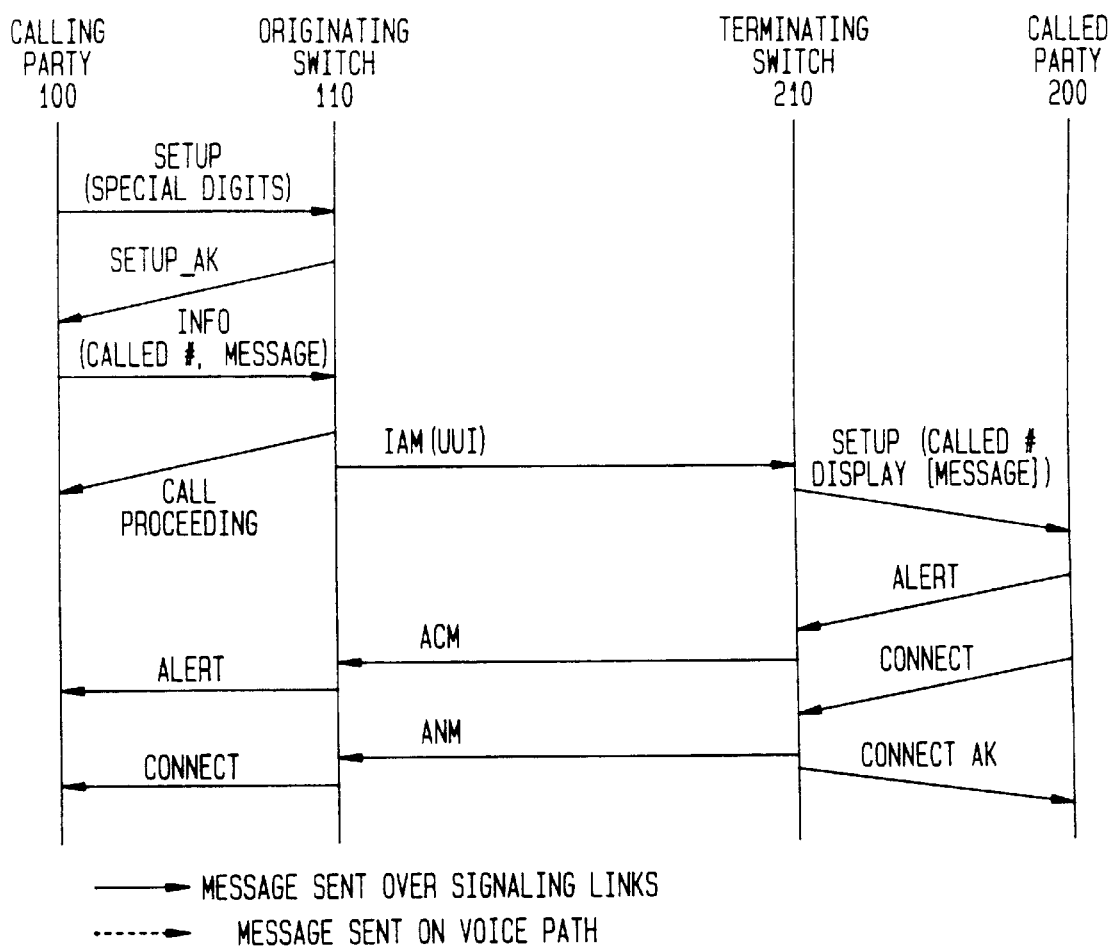
FIG. 9 illustrates the message flow for the processing flow of FIG. 8.

In another exemplary embodiment of the present invention, the calling party is the subscribing party and thus can initiate the message transfer on demand. FIG. 8 illustrates the ISDN processing flow for the case in which the calling party explicitly designates the call as belonging to a special service by dialing digits to request the message service (i.e., the calling party initiates the message transfer.) FIG. 9 presents the detailed message flow for the processing flow illustrated in FIG. 8, depicting this embodiment of the present invention. In the embodiment of FIGS. 8 and 9, the message is assumed to be textual for illustrative purposes, however, as for the other example embodiments, voice messages may equally be used.

Referring to FIG. 8, the calling party invokes the message transfer in step 600 by entering a special code or series of digits which are contained in the SETUP message sent over signaling links. In step 605, the originating switch 110 acknowledges the request and prompts the calling party for more information. The calling party 100 in step 610 enters the called party number and the textual message that to be sent. The originating switch 110 will the route the call to the terminating switch 210 of the called party 200, along with the text message, in step 615, using standard ISDN procedures. In this embodiment, the functions performed by the special server 120 in the embodiments of FIGS. 4 through 7 are performed by the originating switch 110. The terminating switch 210 then delivers the text message to the called party 200 for display in step 620. At this point, the call proceeds normally in step 630.

Referring now to FIG. 9, the SETUP message generated by the calling party 100 as in the previous embodiments specifies that the messaging service is being invoked via the calling party's entering a special code or series of digits. (See step 600 FIG. 8.) The originating switch 110 responds with a SETUP ACKNOWLEDGEMENT requesting more information. (See step 605 FIG. 8.) The calling party 100 then enters the called party number and the textual message that they wish to send. (See step 610 FIG. 8.) This information is packaged and delivered to the originating switch 110 in one or more INFORMATION ("INFO") messages. When all of the information has been received by the originating switch 110, the originating switch 110 generates a CALL PROCEEDING message to the calling party 100, and completes the call using standard ISDN procedures to the terminating switch 210. (See step 615 FIG. 8.) The Initial Address Message ("LAM") contains the text message being delivered in the UUI element. The message is sent to the called party 200 by the terminating switch 210 in the DISPLAY information element of the SETUP message. (See step 620 FIG. 8.) At this point, the call proceeds normally. (See step 630 FIG. 8.)

A server function element is required in the present invention. The server function element of the present invention must be able to perform the following functions: (1) terminate multiple telephone connections; (2) place a connection on hold (When a text message is sent in a embodiment which does not utilize a special network server, there is no need to place the call on hold prior to sending the message.); (3) bridge connections; (4) receive and store voice messages; (5) play stored messages over telephone connections; and, (6) retrieve a called party address from a dialed alias. In the example embodiments of FIGS. 4–7, the server function element was the special server 120. In the example embodiment of FIGS. 8–9, the server function element was the originating switch 110. An example of the server function element, as utilized in the several illustrative embodiments of FIGS. 4 through 7 discussed, is AT&T's Conversant™ System. Examples of the originating switch of the embodiments of FIGS. 8 and 9 which are capable of performing these functions are AT&T's 4ESS™ or 5ESS™ switches. In other embodiments, the terminating switch 210 or any other similar device in the communication network (i.e., a device having the necessary "intelligence" to perform the above enumerated functions) can be utilized as the server function element.

Figure 10:
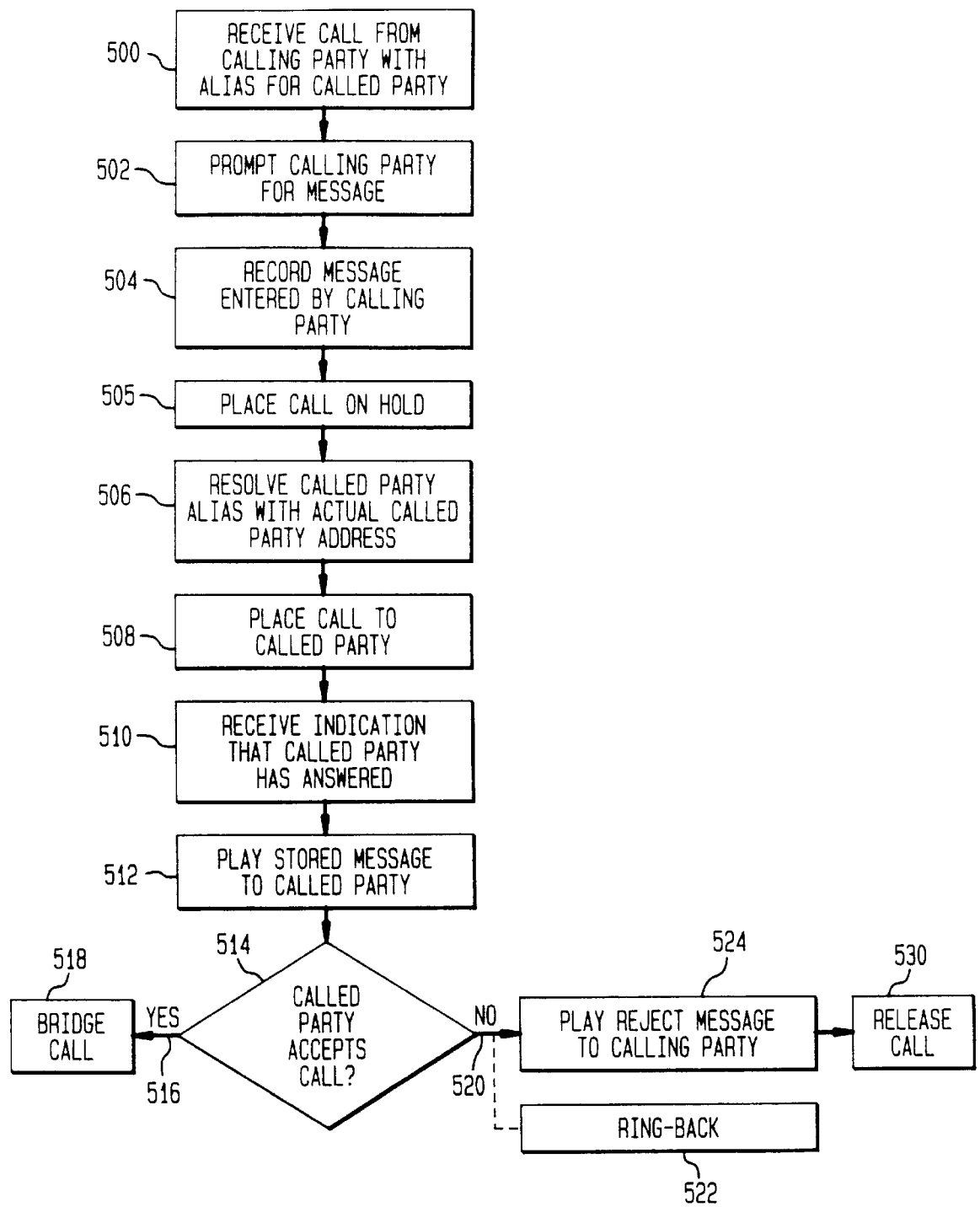
FIG. 10 illustrates the processing flow for the server function element processing a voice message according to the present invention.

The processing flow for the server function element of the present invention is shown in FIGS. 10 and 11 and is described in detail below.

FIG. 10 presents the server process flow for a voice message. In step 500, the server function element receives an incoming call destined for the called party 200. In step 502, the server function element accepts the call and prompts the calling party 100 for a message. In step 504, the server function element then accepts the calling party voice message and records or stores it. The calling party is then placed on hold in step 505 and waits for instructions from the calling party. The server function element, in step 506, resolves the called party alias with the actual address of the called party 200, and in step 508 the server function element places the call to the resolved address of the called party. The flow continues along the "VOICE" path to step 510 where, after receiving an indication that the called party 200 has answered the call (i.e., the connection has been established), the server function element in step 512 plays the stored message for the called party over the newly established connection.

In step 514, the server function element resolves, based on input from the called party, to either accept the call (step 516), or reject the call (step 520). Where the called party has accepted the call (516), the server function element will bridge the call (either connect or forward) in step 518. Where the called party has not accepted the call (520), the server function element will either, at the choice of the called party, do nothing and "Ring Back" (i.e., allow a "ring no answer condition to persist) in step 522, or can be configured to play an announcement to the called party that the call was not accepted by the called party 200 (step 524) and finally release the call in step 530.

FIG. 11 presents the server process flow for a text message. In step 700, the server function element receives an incoming call destined for the called party 200. In step 702, the server function element accepts the call and prompts the calling party 100 for a message. In step 704, the server function element then receives the text message from the calling party voice message and records or stores it. The calling party is then placed on hold in step 705 and waits for instructions from the calling party. The server function element, in step 706 resolves the called party alias with the actual address of the called party 200, and in step 708 the server function element then initiates a call to the resolved address of the called party, using standard ISDN procedures, and sends the text message for display to called party 200 as part of the call SETUP message. selected to either "wait" or "bridge" the call. chosen, the call is bridged immediately in step 735. The step 740). chosen, the server function element resolves in step 714, party, to either accept the call (step 716), or reject the call party has accepted the call (716), the server function ill (either connect or forward) in step 718. Where the called party has he call (720), the server function element will either, at the choice of the called party, do nothing and "Ring Back" (i.e., allow a "ring no answer" condition to persist) in step 722, or it can be configured to play an announcement to the called party that the call was not accepted by the called party 200 (step 724) and finally release the call in step 730.

In another embodiment of the present invention, as in the called party initiated messaging service, in calling party initiated service the call could be routed to a server function element upon receiving the called party number. The server function element would then prompt the calling party for the message. The message flows for text and voice messages would be similar to those of the called party initiated messaging service.

For the illustrative embodiments where the voice message is stored in a server function element as acquired over the voice path established between the server function element and the cang party, signalling messages may be used instead to carry the voice message. Here, the voice message would be digitized at the ISDN phone, INFORMATION messages would carry the voice message into the network, and USR messages would be used to carry the voice message within the network. The called party phone would decode the digitized voice and play the message for the called party.

In alternative embodiments, a packet network may be used to carry the voice conversation, such as an ATM-based B-ISDN, or and Internet-like network, then voice and text messages would be carried between the calling party and network within these packets using procedures similar to those described above.

Although both the calling or called party initiated service in the illustrative embodiments described herein are implemented assuming ISDN equipment, the features of the present invention can also be realized using POTS ("Plain Old Telephone Service"). For POTS implementation, the signalling between the calling and called parties and the networks would be done using DTMF signals.

This messaging service can be combined with other existing services. For example, this service can be combined with call waiting where when a call arrives at a terminating switch for a party that is already active in a call, a textual message is displayed when the tone is generated to the called party indicating that a second call has arrived. If the message is a voice message, the called party will signal by a flashhook to receive the voice message. This service will allow a subscriber to decide to either interrupt their current call to handle the second call, forward the second call to voice mail, or not answer the second call.

The present invention has been illustrated and described with respect to specific exemplary embodiments thereof. It will be readily understood, however, that the above-described embodiments are merely illustrative of the principles of the invention and are not intended to be exclusive or otherwise limiting embodiments. It should further be understood that the foregoing and many various modifications, omissions and additions may be devised by one skilled in the art without departing from the spirit and scope of the invention.

We claim:

1. A method for identifying a calling party of a telephone call to a called party, the method comprising the steps of:

receiving said telephone call over a first telephone connection from said calling party, said telephone call directed to a telephone number of said called party dialed by said calling party;

determining whether said telephone number is a subscriber's telephone number or whether said calling party has entered an activation code with the dialed telephone number;

prompting said calling party to enter a message in both of the following situations:
   a) when the telephone number is a subscriber's telephone number; and
   b) when the calling party has entered an activation code with the dialed telephone number;

receiving said message over said first telephone connection from said calling party, said message containing user-user information, including an identification of said calling party;

establishing a second telephone connection to a called party in response to receiving said message;

sending said message over said second telephone connection to said called party;

receiving a call processing input over said second telephone connection from said called party; and bridging said first telephone connection to said second telephone connection thereby establishing an end-to-end connection from said calling party to said called party, if said call processing input represents an instruction to accept the call.

2. The method of claim 1, wherein said network is an Integrated Services Digital Network.

3. The method of claim 1, wherein said network is a broad band Integrated Services Digital Network.

4. The method of claim 1, wherein said network is a packet network.

5. The method of claim 1, wherein said network is a POTS network utilizing DTMF signals.

6. The method of claim 1, wherein said method is implemented on a network server.

7. The method of claim 1, wherein said method is implemented on an originating switch.

8. The method of claim 1, wherein said method is implemented on an intermediate switch.

9. The method of claim 1, wherein said method is implemented on a terminating switch.

10. A telecommunications system, comprising:

means for receiving a telephone call over a first telephone connection from a calling party, said telephone call directed to a telephone number of said called party dialed by said calling party;

means for determining whether said telephone number is a subscriber's telephone number or whether the calling party has entered an activation code with the dialed telephone number;

means for prompting said calling party to enter a message in both of the following situations:
a) when the telephone number is a subscriber's telephone number; and
b) when the calling party has entered an activation code with the dialed telephone number;

means for receiving a message from said calling party over said first telephone connection, said message containing user-user information, said user-user information including an identification of the calling party;

means for establishing a second telephone connection to a called party in response to receiving said message;

means for sending said message over said second telephone connection to said called party;

means for receiving a call processing input over said second telephone connection from said called party; and means for bridging said first telephone connection to said second telephone connection based on said call processing input, thereby establishing an end-to-end connection from said calling party to said called party.

11. The telecommunications system of claim 10, further including a means for placing the first connection on hold.

12. The method of claim 1, wherein the message is one of a voice message and a text message.

13. The method of claim 12, wherein the step of receiving the message over the first telephone connection includes the step of prompting the calling party to enter the message.

14. The method of claim 13, wherein the step of receiving the call processing input over the second telephone connection includes the step of prompting the called party to enter the call processing input.

15. The method of claims 14, wherein the step of receiving the telephone call over the first telephone connection includes the step of placing the telephone call on hold.

16. The method of claim 15, wherein the step of processing the telephone call includes the step of forwarding the call over a third telephone connection to an alternate location when the call processing input is an instruction to forward the telephone call.

17. The method of claim 15, wherein the step of receiving the telephone call over a first telephone connection includes the steps of:

receiving a dialed telephone number at an originating switch;

determining whether the dialed telephone number is a subscriber's telephone number; and routing the call to a server function element to establish the first telephone connection.

18. The method of claim 15, wherein the step of receiving the telephone call over a first telephone connection includes the steps of:

receiving a dialed telephone number and an activation code at an originating switch, the activation code indicating that a message will be transferred; and routing the telephone call from the originating switch to a server function element to establish the first telephone connection.

19. The method of claim 15, further including the step of sending a ring-no answer signal to the calling party when the call processing input is an instruction to reject the telephone call.

20. The method of claim 15, further including the step of sending an announcement to the calling party when the call processing input is an instruction to reject the telephone call.

21. The method of claim 15, wherein the message containing user-user information is a text message.

22. The method of claim 21, wherein the text message is entered by a keyboard.

23. The method of claim 15, wherein the message is a pre-stored message sent by the calling party.

24. The method of claim 15, further including the step of converting the text message into an audio message.

25. The method of claim 15, further including the step of storing the message prior to the step of sending the message over the second telephone connection.

26. The method of claim 15, wherein the step of sending the message over a second telephone connection further includes the steps of:

alerting the called party to the message by a call-waiting signal; and allowing the called party to place an existing call to the called party on hold, receive the message, and enter the call processing input.

27. A system for interactive identification of a telephone call on a telecommunications network, comprising:

an originating switch receiving a telephone call directed to a telephone number of a called party; and a server function element receiving said telephone call forwarded from said originating switch over a first telephone connection, said server function element:

1) determining whether said telephone number is a subscriber's telephone number or whether the calling party has entered an activation code with the dialed telephone number;
2) prompting said calling party to enter a message in both of the following situations:
   a) when the telephone number is a subscriber's telephone number; and
   b) when the calling party has entered an activation code with the dialed telephone number;
3) establishing a second telephone connection to said called party,
4) sending said message to said called party over said second telephone connection,
5) receiving a call processing input over said second telephone connection from said called party in response to said message, and
6) bridging said first telephone connection to said second telephone connection based on said call processing input, thereby establishing an end-to-end connection from said calling party to said called party.

28. The system of claim 27, wherein the server function element is physically located in the originating switch.

29. The system of claim 27, wherein the server function element is physically located in the terminating switch of the telecommunications network associated with the called party.

30. The system of claim 27, wherein the server function element is physically located in a network server of the telecommunications network.

31. The system of claim 27, wherein the server function element is physically located in an intermediate switch of the telecommunications network, the telephone call being routed from the originating switch to a terminating switch associated with the called party via the intermediate switch.

32. The system of claim 27, wherein the telecommunications network is an Integrated Services Digital Network.

33. The system of claim 27, wherein the telecommunications network is a broad band Integrated Services Digital Network.

34. The system of claim 27, wherein the telecommunications network is a packet network.

35. The system of claim 27, wherein the telecommunications network is a POTS network utilizing DTMF signals.

36. The system of claim 27, wherein the message is one of a voice message and a text message.

37. The system of claim 36, wherein the server function element prompts the calling party to enter the message containing user-user information.

38. The system of claim 37, wherein the server function element prompts the called party to enter the call processing input.

39. The system of claim 38, wherein the server function element places the telephone call received from the originating switch on hold.

40. The system of claim 39, wherein the server function element processes the telephone call by forwarding the call over a third telephone connection to an alternate location when the call processing input is an instruction to forward the telephone call.

41. The system of claim 40, wherein the originating switch receives a dialed telephone number, determines whether the dialed telephone number is a subscriber's number, and routes the call to the server function element to establish the first telephone connection.

42. The system of claim 41, wherein the originating switch receives a dialed telephone number and an activation code with the telephone call, the activation code indicating that a message will be transferred.

43. The system of claim 42, wherein the server function element sends a ring-no answer signal to the originating switch when the call processing input is an instruction to reject the telephone call.

44. The system of claim 43, wherein the server function element sends an announcement to the called party when the call processing input is an instruction to reject the telephone call.

45. The system of claim 44, wherein the message containing user-user information is a text message.

46. The system of claim 45, wherein the message is pre-stored in a calling device associated with the calling party.

47. The system of claim 46, wherein the server function element converts the text message into an audio message.

48. The system of claim 47, wherein the server function element stores the message before sending the message to the terminating switch.

* * * * *